US 7,120,609 B1

(12) United States Patent
Kerkdijk

(10) Patent No.: US 7,120,609 B1
(45) Date of Patent: Oct. 10, 2006

(54) SYSTEM FOR SECURE TRANSACTIONS

(75) Inventor: Hendrikus Kerkdijk, Ex Groningen (NL)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/857,383

(22) PCT Filed: Oct. 25, 1999

(86) PCT No.: PCT/EP99/08157

§ 371 (c)(1),
(2), (4) Date: Jun. 1, 2001

(87) PCT Pub. No.: WO00/33219

PCT Pub. Date: Jun. 8, 2000

(30) Foreign Application Priority Data

Dec. 2, 1998 (EP) .................................. 98204063

(51) Int. Cl.
*G06Q 99/00* (2006.01)
(52) U.S. Cl. ..................... 705/78; 713/150; 713/155; 713/156; 705/26; 705/64; 705/65; 705/80; 705/67; 705/70; 705/75; 705/76
(58) Field of Classification Search ........... 705/64–80, 705/26; 713/155, 156, 150, 1
See application file for complete search history.

(56) References Cited

U.S. PATENT DOCUMENTS

| 5,671,280 | A | | 9/1997 | Rosen |
| 5,790,677 | A | | 8/1998 | Fox et al. |
| 5,987,440 | A | * | 11/1999 | O'Neil et al. ................. 705/44 |
| 6,026,375 | A | * | 2/2000 | Hall et al. .................... 705/26 |
| 6,175,921 | B1 | * | 1/2001 | Rosen ........................ 713/173 |
| 6,185,546 | B1 | * | 2/2001 | Davis .......................... 705/51 |
| 6,269,343 | B1 | * | 7/2001 | Pallakoff ..................... 705/26 |
| 6,378,075 | B1 | * | 4/2002 | Goldstein et al. ........... 713/200 |

(Continued)

FOREIGN PATENT DOCUMENTS

EP        1006469 A1    6/2000

(Continued)

OTHER PUBLICATIONS

Patiyool et al., "Techniques for Authentication Protocols and Key Distribution on Wireless ATM NEtworks".*

(Continued)

*Primary Examiner*—James P. Trammell
*Assistant Examiner*—Jalatee Worjloh
(74) *Attorney, Agent, or Firm*—Frishauf, Holtz, Goodman & Chick, P.C.

(57) ABSTRACT

A multimedia network (1) with connected customer stations (2), merchant servers (3), and a payment server (5). Secure electronic transactions are performed using a secure electronic transactions protocol (SET), including exchange of digital certificates, managed by a Trusted Third Party Server (9). The customer stations comprise transactions management means (10), fit for performing said SET protocol and for managing said certificates for the customer station. A remote customer agent (13) represents the customer station in the negotiation and payment process. The customer station (2) comprises an agent interface (12), fit for transmission of codes, parameters and certificates between the customer agent (13) and the transactions management means (10). A remote merchant agent (14) represents the merchant station (3) in the negotiation and payment process with the customer agent (13) or the customer station (3), to have paid for the selected products in a secure way, under control of SET protocol.

8 Claims, 2 Drawing Sheets

U.S. PATENT DOCUMENTS

Figure 1:
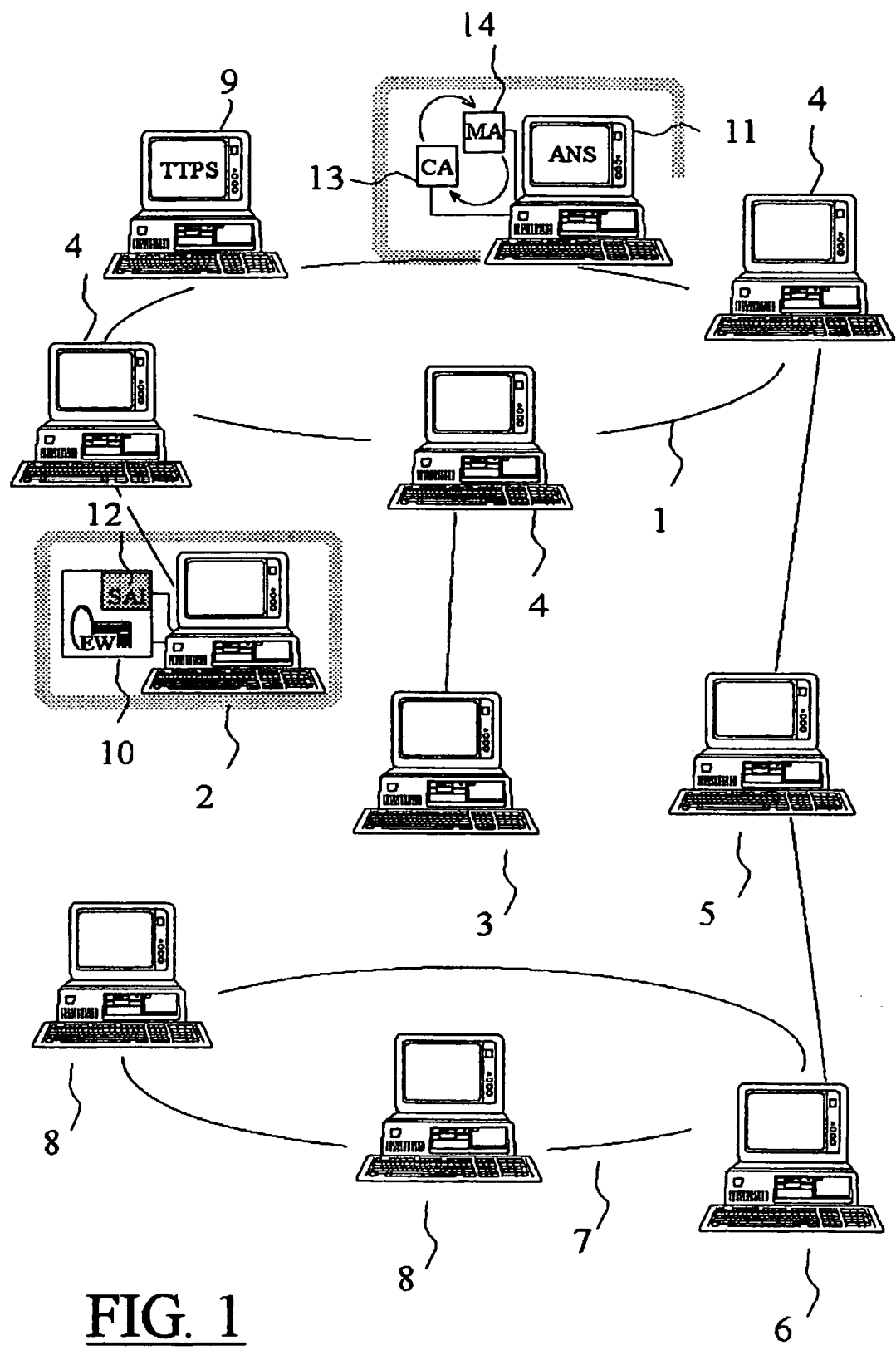

| | | | |
|---|---|---|---|
| 2002/0004783 A1* | 1/2002 | Paltenghe et al. | 705/41 |
| 2002/0026575 A1* | 2/2002 | Wheeler et al. | 713/156 |
| 2003/0070080 A1* | 4/2003 | Rosen | 713/187 |
| 2003/0140007 A1* | 7/2003 | Kramer et al. | 705/40 |

FOREIGN PATENT DOCUMENTS

| | | |
|---|---|---|
| WO | WO 97/26612 | 7/1997 |

OTHER PUBLICATIONS

SET Secure Electronic Transaction Specification; Book 1: Business Description; May 31, 1997; Ver. 1.0; pp. 1-72.

X. Yi et al; A Secure Auction-Like Negotiation Protocol For Agent-Based Internet Trading; 1998 IEEE; pp. 197-203.

* cited by examiner

SYSTEM FOR SECURE TRANSACTIONS

This application is a U.S. National Phase Application under 35 USC 371 of International Application PCT/EP99/08157 (published in English) filed Oct. 25, 1999.

BACKGROUND OF THE INVENTION

The invention relates to a system for the execution of secure transactions in a multimedia network.

Multimedia networks like the Internet offer a wide variety of new possibilities, which will have a great impact on the business environment of the future. Various vendors will start to exploit the Internet as a marketplace. For a customer not to get lost within the vast amount of information that is provided, in the near future agent-based services shall be implemented. Agents are autonomous pieces of software, which may perform tasks for users on the Internet. Based on the user's preferences, they may assist the user in making a selection within the vast range of offered poducts. Complementary to this, the agent may assist in the actual purchase of such a product. As part of this process, the agent will have to be able to perform payments.

One of the biggest inhibitors on Electronic Commerce today is security. Consumers demand that their private information be kept private. When using agent technology within an E-Commerce service, adequate security precautions must be taken. At present, however, agent security is still in its infancy. Therefore, delegating payments to agents is not possible at this moment in time.

SUMMARY OF THE INVENTION

According to the present invention, an architecture is proposed in which agents may perform secure credit card payments. According to the invention, for the execution of such payments the SET (Secure Electronic Transactions) protocol is used, an upcoming standard for secure payments on the Internet by means of credit cards. All new entities and components that are necessary to provide agent-based SET payments will be defined and payment interaction (agent—agent, agent-user and other) will be elaborated upon.

Most entities of the standard infrastructure for performing SET-based payments by means of credit cards are straight-forward analogies to real world credit card payments. A few, however, need further explanation. A brief description of these will be given first.

One of the main issues when providing secure payments is authentication of the involved entities. SET uses a robust set of digital certificates for this purpose. Each participant in a SET transaction requires a specific certificate or set of certificates that not only uniquely identifies this participant, but also attests to his or her privilege as holder of a payment card or as a holder of a Merchant account. Brand Associations (e.g. VISA/MasterCard) or Card Issuers commission so called Certificate Authorities (CAs) to carry out the work of managing SET digital certificates.

Complementary to this, SET introduces the notion of a Payment Gateway, which is needed to validate SET digital certificates and preprocess authorisation, capture and settlement work concerning the payment at hand. Another fundamental requirement for performing SET payments is a component called an Electronic Wallet (E-Wallet). These wallets embody the SET protocol on the customer side and provide a means to store and manage the certificates to digitally sign messages, along with the security aspects consumers demand to keep private data private.

According to the present invention the task of performing SET credit card transactions is delegated to agents. In developing an infrastructure that enables this, the following constraints have been defined:
   Obtaining certificates is not a task that users will want to delegate to their agents. Furthermore, it is not very probable that banks and CAs will approve of this situation. Therefore, we assume all certificates and the E-Wallet to be in place.
   The standard SET infrastructure shall be kept intact.
   Thereby the inherent security of SET payments shall remain present and the necessary alterations when implementing shall be limited.

Based on these constraints, an infrastructure has been designed wich will be discussed below.

EMBODIMENT OF THE INVENTION

FIG. 1 shows an architecture in which the invention—the use the SET protocol by "secure agents—can be implemented.

FIG. 1 shows a multimedia network—the internet—1. Connected to the internet 1 are customer PCs 2, and merchant servers 3, each via an internet service providers (ISP) 4. Also connected to the internet, via an ISP 4, is a payment (gateway) server 5. The payment server 5 is also—via an access server 6—connected to a "Banker's Interchange Network" (BIN) 7, having banking servers 8 connected to it.

A main issue in secure payments is authentication of entities. The SET protocol, to be used in the system shown in FIG. 1, uses a set of digital certificates for this purpose. Each participant in transaction requires a certificate that uniquely identifies the participant and also attests to his privilege as a holder of a account at the merchant server. Associations like VISA/MasterCard or other Card Issuers commission so called Certificate Authorities to carry out the work of managing SET digital certificates. In FIG. 1 a Trusted Third Party Server (TTPS) 9 of such Certificate Authority is connected to the internet 1 and can be approached by customers 2, merchants 3 and payment servers 5. Payment servers 5 are needed to validate the digital certificates and to preprocess authorisation, capture and settlement work concerning the payment.

Another fundamental requirement for performing SET payments is a system component called "Electronic Wallet" (EW) 10.

An E-wallet 10 embodies the SET protocol at the customer's side and provides means—within the customer's PC 2—to store and manage the needed certificates, to digitally sign messages, along with the security aspects customers demand to keep private data private.

According to the invention agents are used to perform secure transactions. As said before, agents are autonomous pieces of software, which are enabled to perform tasks for users (customers or merchants). Based on preferences set by users 2 (customer) and 3 (merchant), the users' respective agents assists or represent the users in presenting and selecting of the merchants' products and, complementary to this, the users' respective agents assist or represents the users to purchase (collect) the selected products and to perform the secure payment for it.

Each customer 2 may be represented by a customer agent (CA), while each merchant 3 may be represented by a merchant agent (MA). The negotiation process (presentation, selection and collection of products and the payments for the collected products) is executed within an "agent platform", preferably embodied within an "Agent Negotiation Server" (ANS) 11. Communication between the customer's PC 3 and the customer's agent at the ANS's side is performed, at the customer's side via the E-wallet 10—meant for SET based transaction—which is extended with a special SET Agent Interface (SAI) 12.

The CA 13 communicates with the customer by means of the customer's "browser" (customer inferface) and, via the SAI 12, with the customer's E-Wallet 10 in order to initialise payments. As was the case according to the state-of-the-art (using credit cards), the actual SET payment process is performed between the E-Wallet 10 and the Merchant server 3. Therefore, during actual payment interaction the level of trust is the same as in known, credit card based SET payments.

The CA 13 will have to be authorised to initialise the EW 10 for payments. In standard SET transactions the customer is prompted—via the customer's browser—to enter the E-Wallet password for this purpose. The CA 13 and the SAI 12 will have to be implemented such, that one of two scenarios may be performed: either the CA 13 has authorisation to release the cryptographic content of the E-Wallet 10 itself, or, after agent initialisation, the customer is prompted to provide an E-Wallet password. In the latter case, customer interaction is necessary. This is not desirable from a usability point of view, but might be preferred by customers (or merchants), since this will give them a sense of control over the payment.

Figure 2:
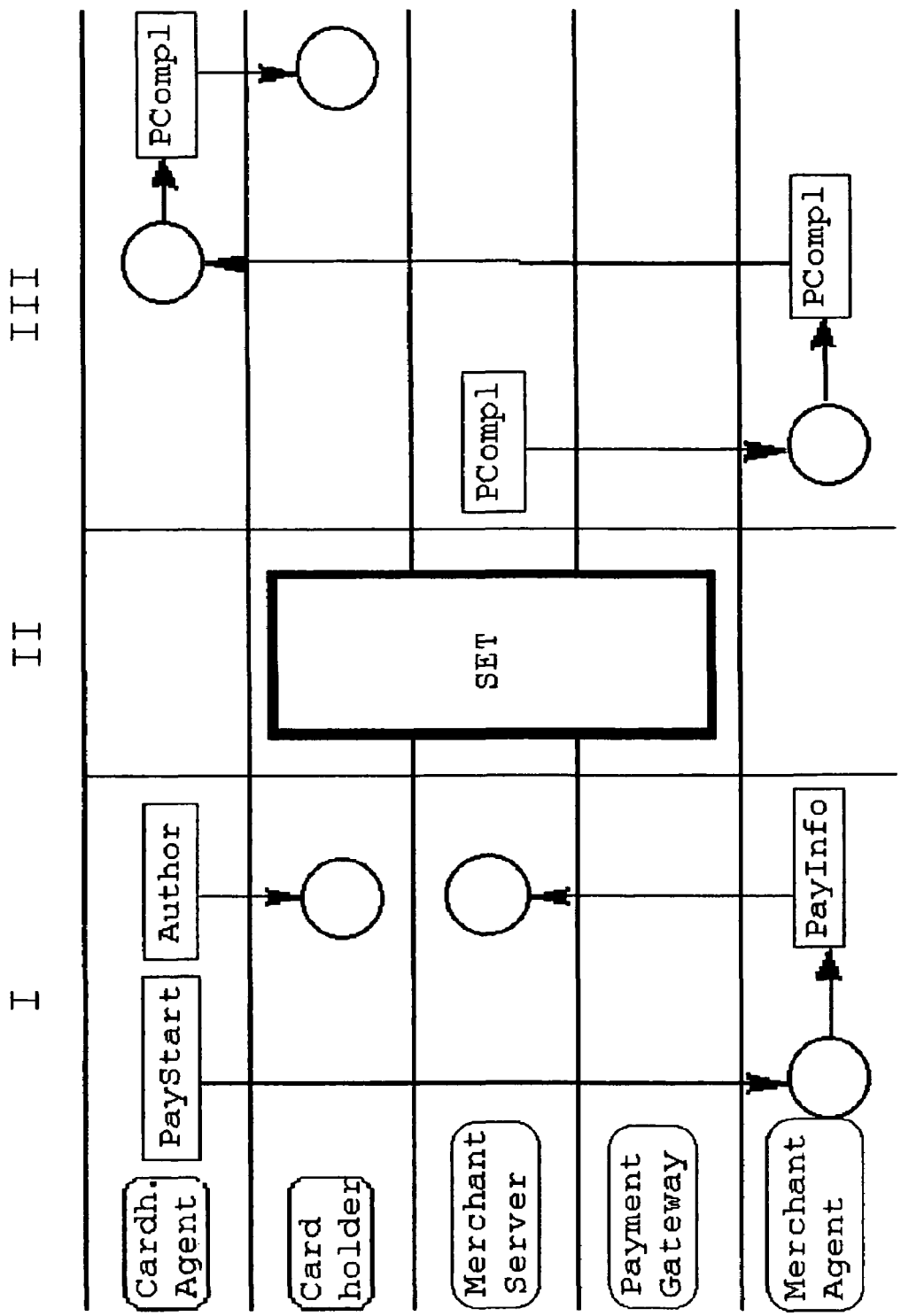

FIG. 2 shows a communication procedure for the system presented in FIG. 1.

For authentication and authorisation purposes, the CA 13 will carry a token, in which an authorisation code for opening up the E-Wallet is encapsulated. The level at which this token is secured within the agent depends on the location of the platform in which the CA 13 performs its tasks. If this platform resides on the customer PC, security requirements on both storing the token within the agent and communicating it to the E-Wallet are less strong than if the agent resides on a remote platform like the ANS 11 as suggested in FIG. 1. In the latter case, the token will need to be adequately secured, as will. communication between the agent and the E-Wallet. The security requirements are as follows:

The token is stored within the CA 13 in encrypted form, using a random key. A symmetric encryption scheme, such as DES, shall be applied here. This random key is generated at the PC 2 for each specific purchase. A new key shall be generated for each item that is to be bought by the agent.

For communication purposes, both the customer 2 and the CA 13 need to own a specific certificate, other than the SET certificate. Payment start messages shall be communicated to the E-Wallet 10 in encrypted form, using a random session key. A symmetric encryption scheme, such as DES, shall be applied here. In turn, this random key shall be sent over in encrypted form, using the customer's public key related to the communication certificate. The message shall be signed with the agent's private key and a time stamp shall be added to the message in order to prevent replay by malicious parties.

In FIG. 2 the following communication steps are performed:

In step I, the CA 13 requests the Merchant Agent (MA) 14 to pay by credit card. The latter then informs the merchant server 3 of the requested payment, while parallell to that the CA 13 initialises the EW 10.

In step II, the standard SET procedure is performed by the EW 10, the Merchant server 3 and the Payment Gateway server 5.

Finally, in step III, after completion of the payment, the Merchant server 3 informs the MA 14 of this fact. The MA 14 passes this message on to the CA 13, which notifies the customer of payment completion.

The infrastructure and message flows are a natural extension of any agent-based infrastructure. Implementation may therefore by performed straightforwardly.

The invention claimed is:

1. A system for the execution of secure transactions in a multimedia network, the system comprising:

a multimedia network with customer stations, merchant servers, and a payment server connected to it, secure electronic transactions being performed using a secure electronic transactions protocol, comprising the exchange of digital certificates, uniquely identifying the relevant transaction participants and also attesting their privileges at the merchant server, said certificates being managed by a Trusted Third Party Server being connected to said multimedia network, said payment server being configured to validate the digital certificates presented and to process authorization concerning the payment, said customer stations comprising transaction management means for performing said secure electronic transactions protocol and for managing said certificates for the customer station, further comprising a remote customer agent, managed by agent parameters received from said customer station and thus, under the control of said parameters, representing the customer station in a negotiation process, including selecting products to be presented by the merchant server, payment for selected products being performed in a secure way, under control of said secure electronic transactions protocol and said certificates, the payment process being performed between said transactions management means and the merchant server, wherein said customer station comprises an agent interface for transmission of codes, parameters and certificates between said customer agent and said transactions management means, the system further comprising a remote merchant agent, managed by agent parameters received from said merchant station and thus, under the control of said parameters, capable of representing the merchant station in a negotiation process, including presenting products to the customer agent or the customer station, and to have paid for products being selected by the customer agent or the customer station, in a secure way, under control of said secure electronic transactions protocol and said certificates, wherein said customer agent is configured to request said merchant agent to pay by credit card, the merchant agent is configured to inform said merchant server of the requested payment, while parallel to that the customer agent is configured to initialize said transactions management means;

wherein the transaction management means, the merchant server and the payment server are configured to perform a standard secure electronic transaction procedure; and wherein after completion of the payment process, the merchant server is configured to inform the merchant agent of completion of the payment process, the merchant agent is configured to pass this message on to the customer agent, and the customer agent is configured to notify the customer station of the payment completion.

2. The system according to claim 1, wherein said negotiation and payment process by said customer agent and said remote merchant agent is performed within an agent negotiation server, connected to said multimedia network.

3. The system according to claim 1, wherein within said secure electronic transaction protocol, for authentication and authorization of said customer agent, a token is encapsulated, comprising an authorization code for opening up said transactions management means.

4. The system according to claim 3, wherein said token is stored within the customer agent in an encrypted form, using a random key, the random key being generated at the customer station for each new payment process.

5. The system according to claim 3, wherein both the customer station and the customer agent comprise a specific communication certificate, payment start messages being communicated to said transactions management means in encrypted form, using a random session key which, in turn, is sent over in encrypted form, using the customer station's public key related to said communication certificate, said message being signed with the customer agent's private key related to said communication certificate and a time stamp being added to said message in order to prevent replay by malicious parties.

6. In a system comprising a multimedia network with customer stations, merchant servers, and a payment server connected thereto, secure electronic transactions being performed using a secure electronic transactions protocol, comprising the exchange of digital certificates, uniquely identifying the relevant transaction participants and also attesting their privileges at the merchant server, said certificates being managed by a Trusted Third Party Server being connected to said multimedia network, said payment server being configured to validate the digital certificates presented and to process authorization concerning the payment, said customer stations comprising transactions management means for performing said secure electronic transactions protocol and for managing said certificates for the customer station, moreover, comprising a remote customer agent, managed by agent parameters received from said customer station and thus, under the control of said parameters, representing the customer station in a negotiation process, including selecting products to be presented by the merchant server, while payment for selected products takes place in a secure way, under control of said secure electronic transactions protocol and said certificates, the payment process being performed between said transactions management means and the merchant server, while, moreover, said customer station comprises an agent interface for transmission of codes, parameters and certificates between said customer agent and said transactions management means, and, besides, a remote merchant agent, managed by agent parameters received or to be received from said merchant station and thus, under the control of said parameters, representing the merchant station in a negotiation process, including presenting products to the customer agent or the customer station, and to have paid for products being selected by the customer agent or the customer station, in a secure way, under control of said secure electronic transactions protocol and said certificates, a method for the execution of secure transactions in a multimedia network:

in a first step, said customer agent requests said merchant agent to pay by credit card, and the merchant agent then informs said merchant server of the requested payment, while parallel to that the customer agent initializes said transactions management means;

in a second step, a standard secure electronic transaction procedure is performed by the transactions management means, the merchant server and the payment server; and in a third, final step, after completion of the payment process, the merchant server informs the merchant agent of completion of the payment process, and the merchant agent passes this message on to the customer agent, which notifies the customer station of the payment completion.

7. A data processing device for execution of secure transactions in a multimedia network, the multimedia network comprising merchant servers and a payment server configured to validate digital certificates presented and to process authorization concerning a payment, connected to it, said data processing device comprising:

transaction management means for performing a secure electronic transaction protocol, comprising the exchange of digital certificates, uniquely identifying the relevant transaction participants and also attesting their privileges at the merchant server, said certificates being managed by a Trusted Third Party Server being connected to said multimedia network, and for managing said certificates for said data processing device, said data processing device being configured to manage a remote customer agent by transmitting agent parameters to the remote customer agent for representing the data processing device in a negotiation process under the control of said parameters, including selecting products to be presented by the merchant server, payment for selected products being performed in a secure way, under control of said secure electronic transactions protocol and said certificates, the transaction management means being configured to perform the payment process with the merchant server, wherein said data processing device further comprises an agent interface for transmission of codes, parameters and certificates between said customer agent and said transactions management means, the multimedia network further comprising a remote merchant agent, managed by agent parameters received from said merchant station and thus, under the control of said parameters, capable of representing the merchant station in a negotiation process, including presenting products to the customer agent or the data processing device, and to have paid for products being selected by the customer agent or the data processing device, in a secure way, under control of said secure electronic transactions protocol and said certificates, said customer agent being configured to request said merchant agent to pay by credit card, the merchant agent informing said merchant server of the requested payment, whereby said transactions management means being configured to be initialized by the customer agent;

wherein the transactions management means is configured to perform a standard secure electronic transaction procedure with the merchant server and the payment server; and wherein after completion of the payment process and after receiving information of completion of the payment process from the merchant server, the merchant agent being configured to pass this message on to the customer agent, the data processing device is configured to receive a notification of the payment completion from the customer agent.

8. A data processing device for execution of secure transactions in a multimedia network, the multimedia network comprising a customer station, merchant servers, and a payment server connected to it, secure electronic transactions being performed using a secure electronic transactions protocol, comprising the exchange of digital certificates, uniquely identifying the relevant transaction participants and also attesting their privileges at the merchant server, said certificates being managed by a Trusted Third Party Server being connected to said multimedia network, said payment server being configured to validate the digital certificates presented and to process authorization concerning the payment, said customer station comprising transaction management means for performing said secure electronic transactions protocol and for managing said certificates for the customer station, said data processing device comprising:

a remote customer agent, managed by agent parameters received from said customer station and thus, under the control of said parameters, representing the customer station in a negotiation process, including selecting products to be presented by the merchant server, payment for selected products being performed in a secure way, under control of said secure electronic transactions protocol and said certificates, the payment process being performed between said transactions management means and the merchant server, said customer station comprising an agent interface for transmission of codes, parameters and certificates between said customer agent and said transactions management means, the multimedia network further comprising a remote merchant agent, managed by agent parameters received from said merchant station and thus, under the control of said parameters, capable of representing the merchant station in a negotiation process, including presenting products to the customer agent or the customer station, and to have paid for products being selected by the customer agent or the customer station, in a secure way, under control of said secure electronic transactions protocol and said certificates, wherein said customer agent is configured to request said merchant agent to pay by credit card, the merchant agent informing said merchant server of the requested payment, while parallel to that the customer agent is configured to initialize said transactions management means; and wherein after completion of a standard secure electronic transaction procedure being performed by the transactions management means, the merchant server and the payment server and after receiving information of completion of the payment process from the merchant server, the merchant agent being configured to sass this message on to the customer agent, the customer agent is configured to notify the customer station of the payment completion.

* * * * *

UNITED STATES PATENT AND TRADEMARK OFFICE
CERTIFICATE OF CORRECTION

PATENT NO. : 7,120,609 B1  Page 1 of 1
APPLICATION NO. : 09/857383
DATED : October 10, 2006
INVENTOR(S) : Hendrikus Kerkdijk It is certified that error appears in the above-identified patent and that said Letters Patent is hereby corrected as shown below:

TITLE PAGE:

Item (30) Foreign Application Priority Data, change "98204063" to --98204063.6--.

Signed and Sealed this

Twenty-third Day of January, 2007

JON W. DUDAS
*Director of the United States Patent and Trademark Office*